S. L. C. COLEMAN.
VEHICLE SUSPENSION.
APPLICATION FILED SEPT. 13, 1916.
1,289,398.
Patented Dec. 31, 1918.
9 SHEETS—SHEET 4.
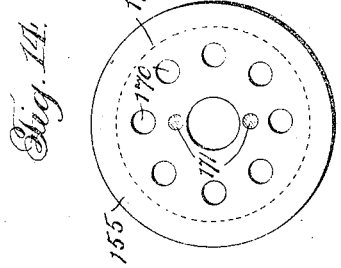
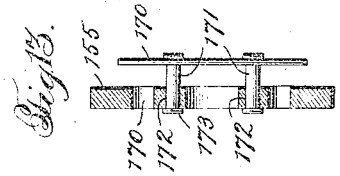
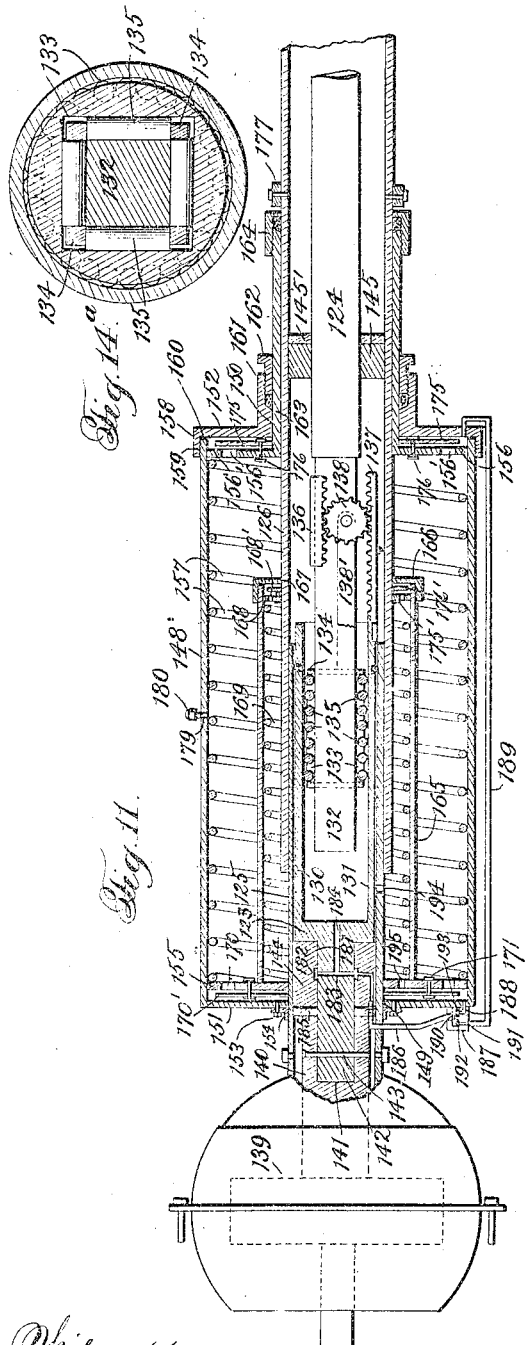
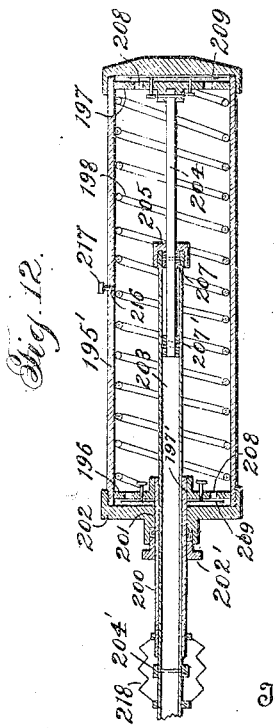
Witness:
Jos. E. Hutchinson.
Inventor
Stephen L. C. Coleman,
By Bacon & Milans Attorneys.

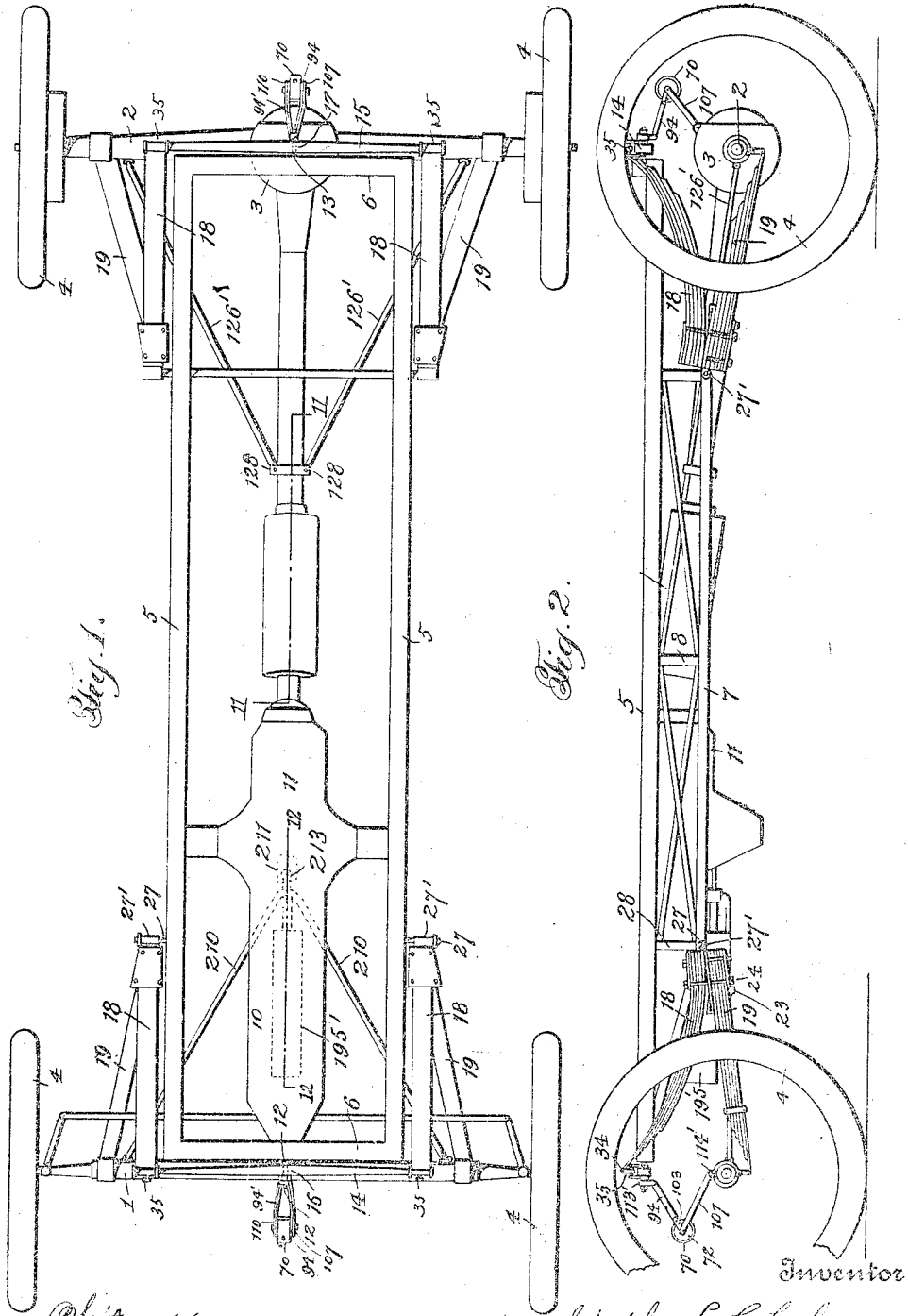

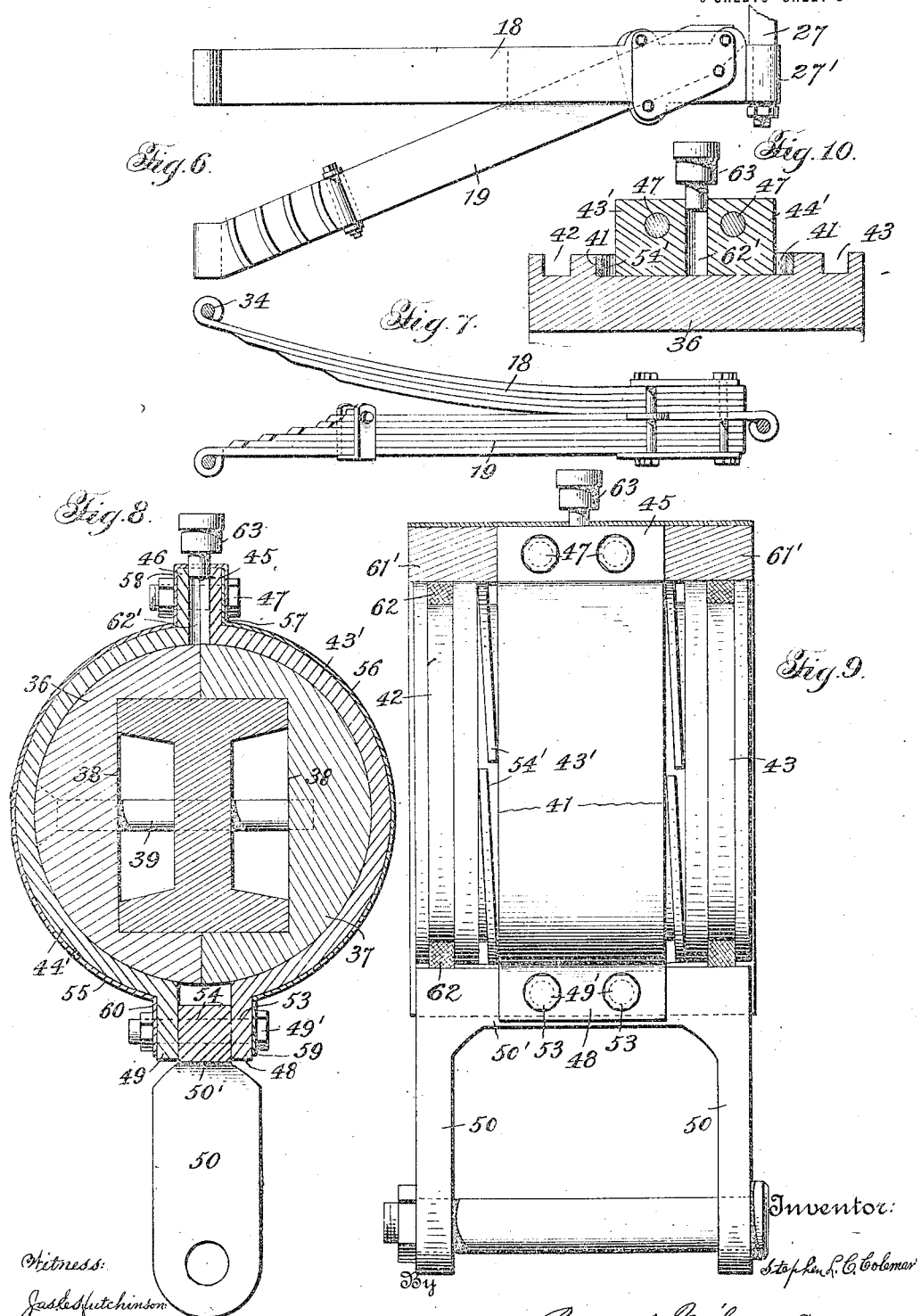

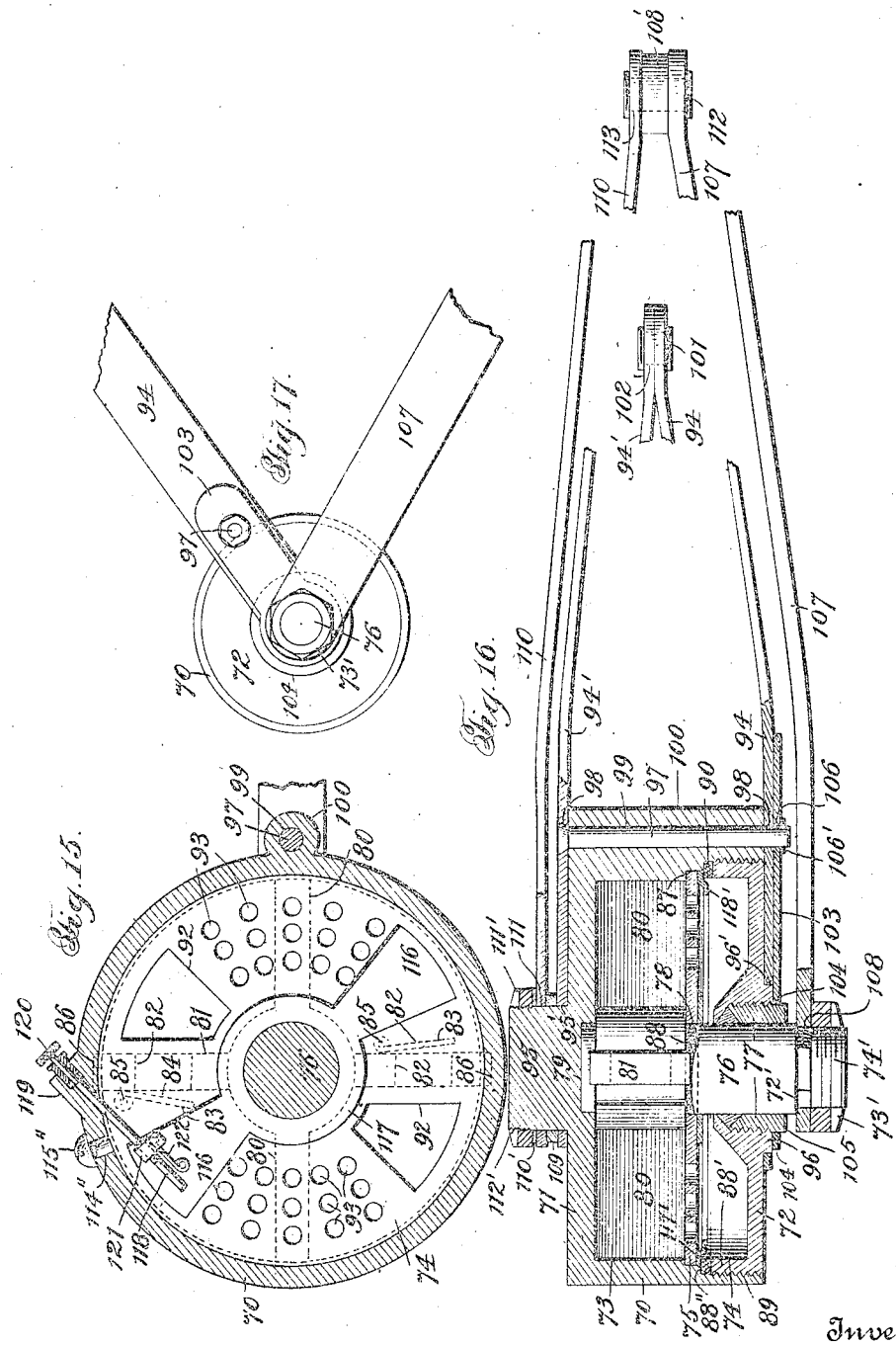

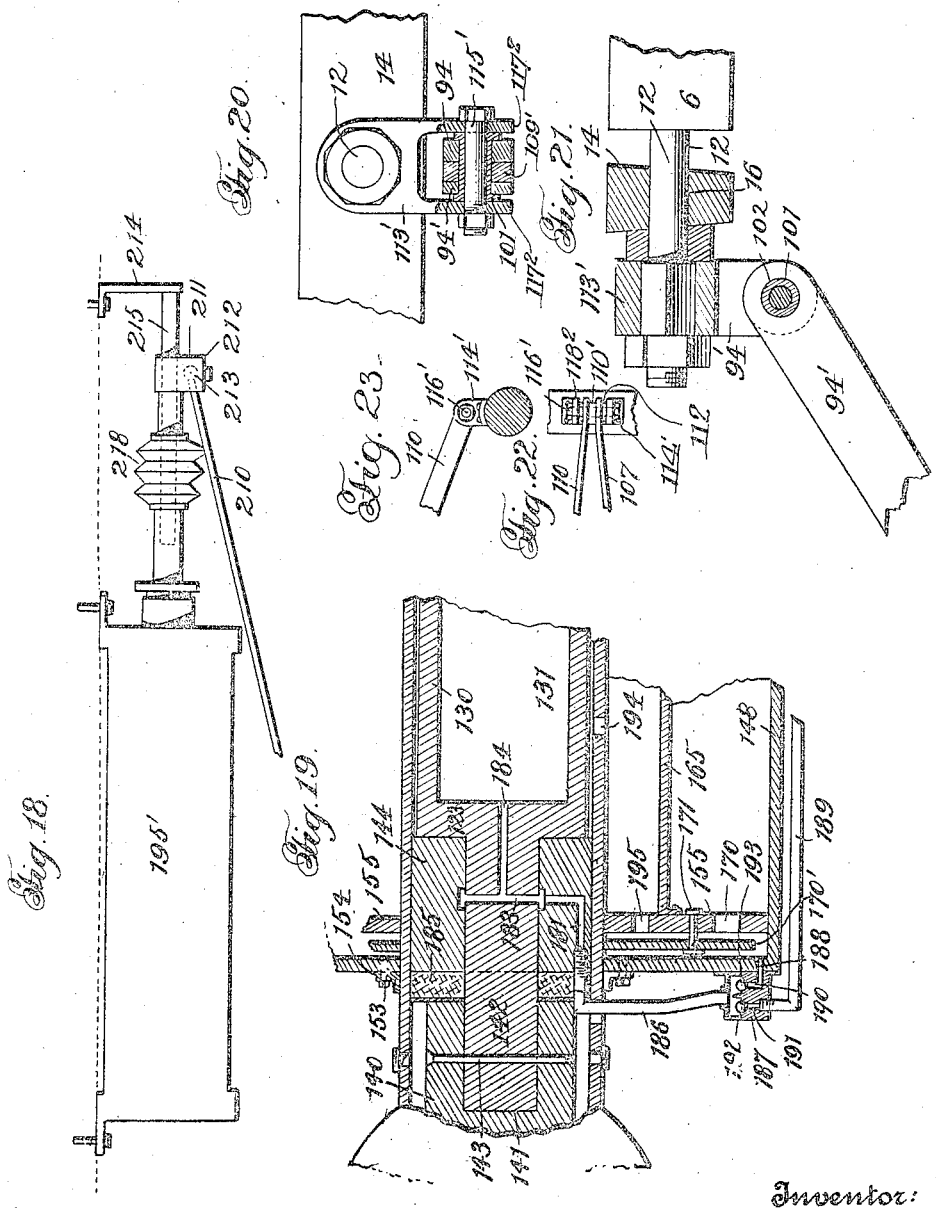

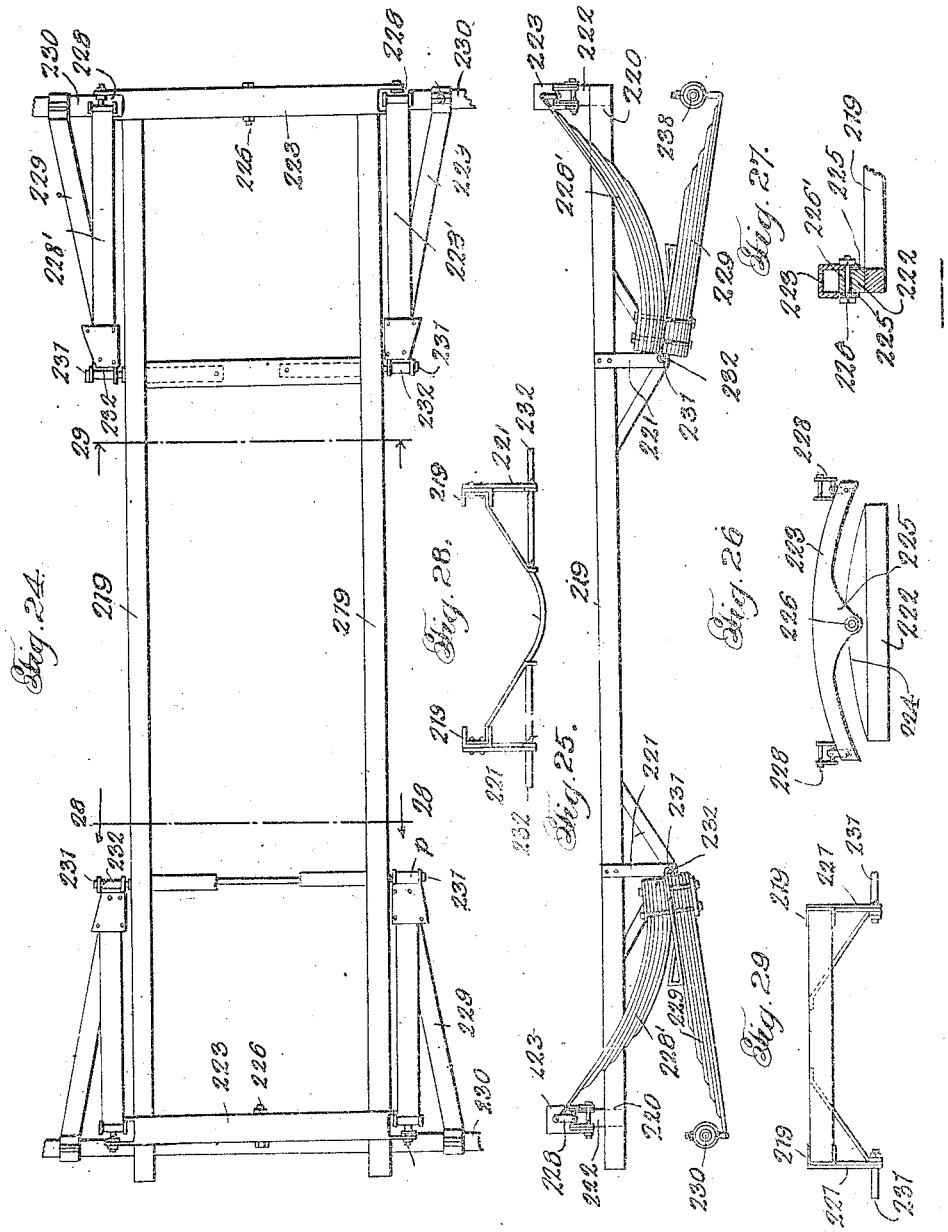

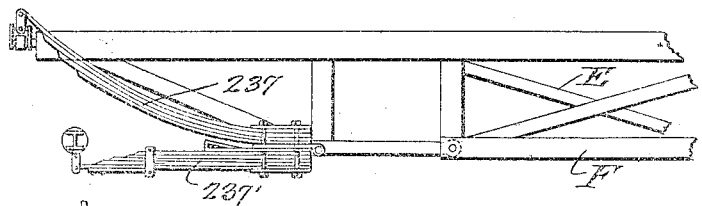
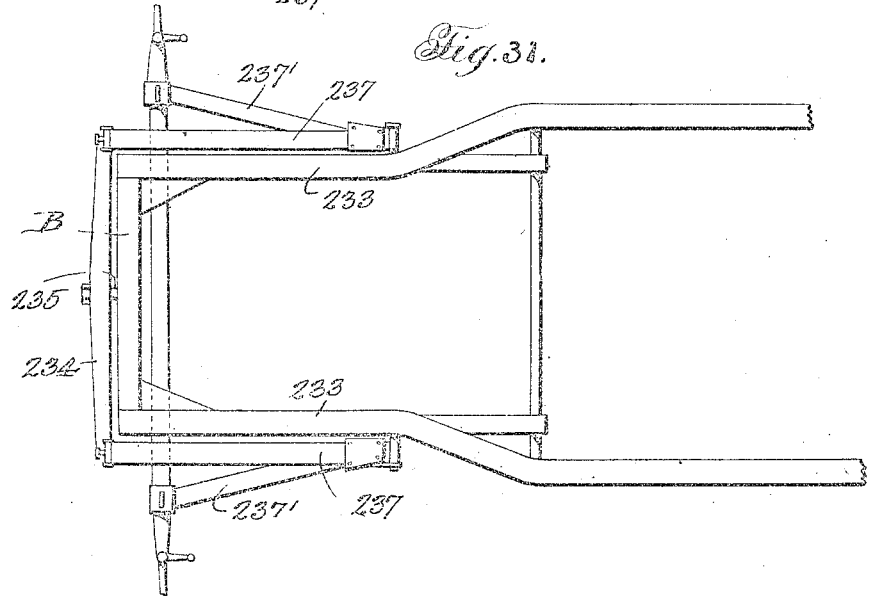

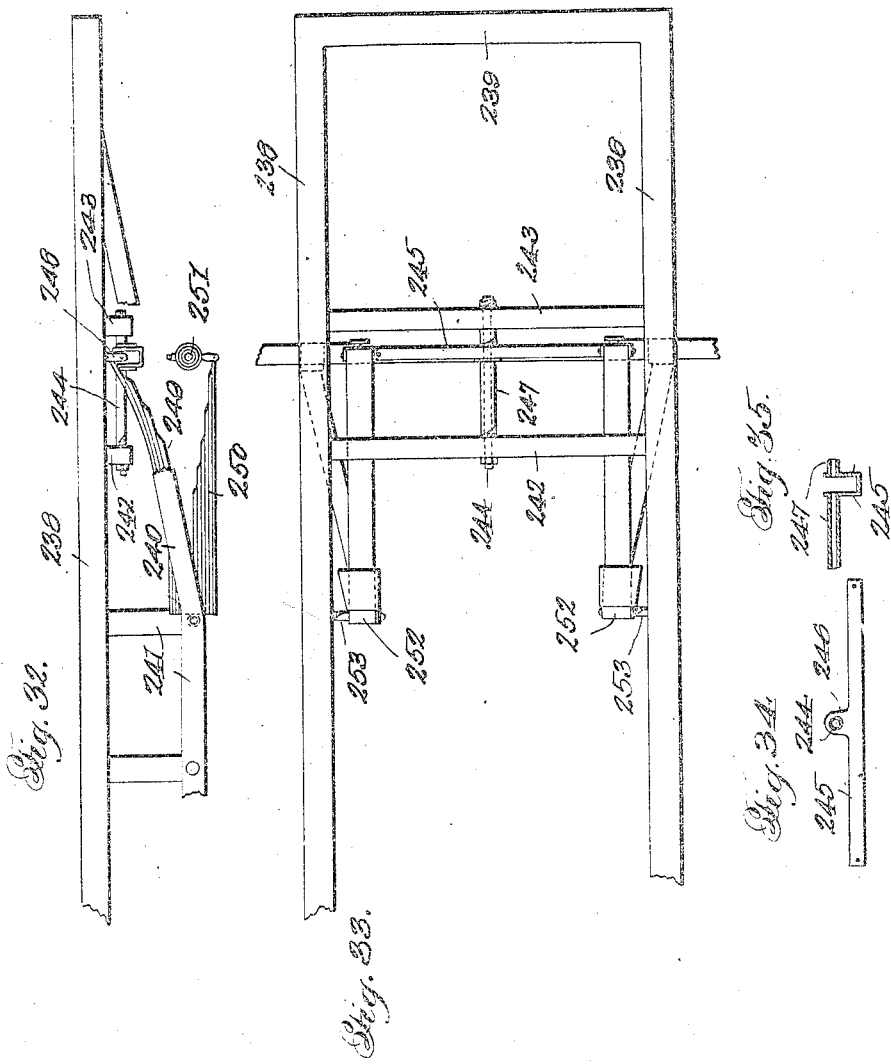

UNITED STATES PATENT OFFICE.

STEPHEN L. CHAUNCEY COLEMAN, OF FREDERICTON, NEW BRUNSWICK, CANADA, ASSIGNOR OF FORTY-NINE ONE-HUNDREDTHS TO CHARLES W. WHELPLEY, OF FREDERICTON, NEW BRUNSWICK, CANADA.

VEHICLE SUSPENSION.

1,289,398.      Specification of Letters Patent.      Patented Dec. 31, 1918.

Application filed September 13, 1916. Serial No. 119,934.

*To all whom it may concern:*

Be it known that I, STEPHEN L. CHAUNCEY COLEMAN, a subject of the King of Great Britain, residing at Fredericton, in the Province of New Brunswick, Dominion of Canada, have invented certain new and useful Improvements in Vehicle Suspensions, of which the following is a specification, reference being had therein to the accompanying drawing.

The present invention relates to improvements in spring suspensions for vehicles particularly motor vehicles.

The object of the invention is to provide an improved spring suspension of simple, relatively light, construction that will effectually absorb the various forms of shocks encountered in operating a motor vehicle, and that will prevent excessive vibration, and lateral rolling of the vehicle body, whereby the liability of injury to the vehicle is greatly reduced and increased comfort and safety in riding and operating the vehicle is assured.

An important novel characteristic of the invention resides in the special means provided for cushioning longitudinal shocks, the extreme flexible nature of the suspension thus afforded making it possible to employ relatively light constructions and permitting of the use of solid tires while at the same time providing for the desired easy riding in the vehicle body when traveling over rough roads.

Another important novel feature of the invention lies in the provision of means for cushioning the strains and shocks received through the driving shaft due to accelerations and retardations of the vehicle.

A further object of the invention is to provide an improved suspension of simple construction capable of effectually absorbing and cushioning small or light shocks as well as more severe or heavy shocks without the use of under load or coil springs, or of over load springs or bumpers.

Another object of the invention is to provide an improved spring suspension in which provision is made for the distribution of one wheel shocks, and the stress of unevenly distributed loads to all of the load springs, the several load springs working together to cushion and absorb the shock whether the same is received through one wheel or both ends of the axle, the construction providing for the automatic adjustment and coaction of the springs with each other to afford equilibrium of support for the body under conditions of unbalanced or unequal distribution of load to the body, whereby lateral rolling of the body is prevented and the use of relatively light springs permitted.

Another important novel feature of the invention resides in the special shackle construction that facilitates the desired horizontal cushioning movements of the axles.

The invention consists in the features of construction, combinations of elements and arrangement of parts, which will be exemplified in the constructions hereinafter described, and illustrated in the accompanying drawings, and the scope of the invention will be indicated in the appended claims.

In the drawings—

Figure 1 is a top plan view of a portion of a vehicle equipped with a spring suspension constructed in accordance with the present invention.

Fig. 2 is a side elevation,

Fig. 6 is a detail plan of a slightly modified spring construction,

Fig. 7 is a side elevation of the spring construction shown in Fig. 6.

Figure 3:
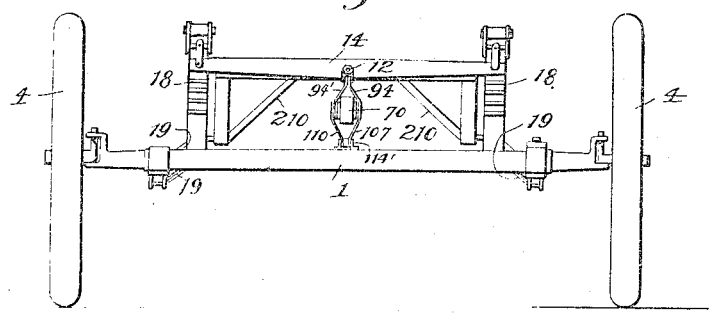
Fig. 3 is an end elevation.

Fig. 8 is a detail central transverse section of one of the shackles for the springs, Fig. 9 is a detail view of the shackle, parts being shown in section and side elevation, Fig. 10 is a detail section of the shackle, Fig. 11 is a longitudinal section on the line 11—11 of Fig. 1, Fig. 12 is a vertical section on the line 12—12 of Fig. 1, Figs. 13 and 14 are detail views on an enlarged scale, of the piston and valve structure forming part of the mechanism shown in Figs. 11 and 12, Fig. 14$^a$ is a detail sectional view, on an enlarged scale, of a part of the structure shown in Fig. 11, Figs. 15, 16 and 17 are detail views of one of the vibration check devices, Fig. 18 is a side elevation of the forward cushioning device and its radius rod connection, Fig. 19 is a detail sectional view, on an enlarged scale, of the forward section of the transmission shaft, the transmission shaft housing and associated parts of the cushioning device, Figs. 20 and 21 are detail views, on an enlarged scale, of the connection between the upper arms of the vibration check devices and the frame, Figs. 22 and 23 are detail views of the connection between the lower pair of arms of the vibration check device and one of the axles, Fig. 24 is a top plan view of a modified form of frame and equalizer bar construction, Fig. 25 is a side elevation of the construction shown in Fig. 24.

Fig. 26 is an end elevation of the modified construction illustrated in Figs. 24 and 25.

Fig. 27 is a detail cross section of the construction illustrated in Fig. 26,

Fig. 28 is a transverse section taken on the line 28—28 of Fig. 24 looking in the direction of the arrow, Fig. 29 is a transverse section taken on the line 29—29 of Fig. 24 looking in the direction of the arrow, Fig. 30 is a side elevation of another modification of equalizer bar and spring construction, only the forward end of the frame being shown, Fig. 31 is a top plan view of the construction shown in Fig. 30, Fig. 32 is a side elevation of another modification of the frame, equalizer bar and spring construction, Fig. 33 is a top plan view of the construction shown in Fig. 32, Figs. 34 and 35 are detail views of the equalizer bar employed in the construction illustrated in Figs. 32 and 33.

Referring to a detail description of the drawings wherein like reference characters designate corresponding parts throughout the several views, 1 designates the front axle, 2 the rear axle housing, 3 the differential housing, 4 the wheels, and 5 and 6 the side and end bars of the frame or chassis, the side bars 5 being shown provided with truss members 7, 8 and 9. 11 designates the lower part of the fly wheel and transmission case, the same being suitably secured to the frame or chassis.

Figure 4:
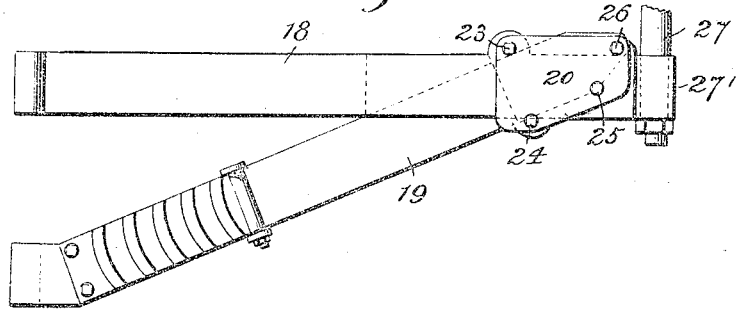
Fig. 4 is a detail plan view, on an enlarged scale, of one of the springs.
Figure 5:
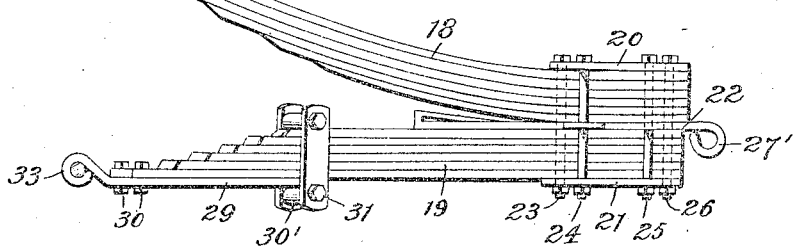
Fig. 5 is a side elevation of the construction shown in Fig. 4.

The frame or chassis is provided with short shafts or pivots 12 and 13 projecting horizontally from the end bars 6. Pivotally connected with the chassis are front and rear transverse equalizing members or bars 14, and 15, said bars being provided with bearings 16 and 17 engaging the short shafts or pivots 12 and 13. At each end of the frame or chassis and at opposite sides thereof is arranged a spring consisting of a pair of leaf springs 18 and 19 that have their butt ends clamped together and pivotally connected to the side bars 5 of the frame, and the outer thin ends or tips pivotally connected respectively to the outer portion of one of the equalizing bars and one of the axles. Referring particularly to Figs. 4 and 5 of the drawings, the butt ends of the leaf springs 18 and 19 are secured together by top and bottom plates 20, 21, an intermediate plate 22, and bolts 23, 24, 25, and 26. The bolts 23 and 24 pass through openings in the several plates and lie in close contact with the sides of the leaf springs. Bolt 25 extends through openings in the plates and openings in all of the leaves of the upper spring member 18, and lies in close contact with one side of the lower spring member 19. Bolt 26 passes through openings in the plates and openings in all of the leaves of the lower member 19 of the spring, and lies in close contact with one side of the leaves of the upper member, this construction providing a very secure clamping of the parts which prevents the butts of the two members of the spring from changing their relative position. The intermediate plate 22 extends out beyond the butt ends of the springs and is bent to form an eye 27' to engage a pivot bolt 27 carried by bracket 28 that is secured to the side bar 5 of the frame. The plate at its other end is bent back upon itself to provide a checking block or filler between the spring members. The lower member 19 of the spring is reinforced and strengthened by a short plate 29 secured at one end to the spring member by bolts 30 and having an eye 30' at its front end engaging a connecting bolt of a clamp 31. The outer end of the plate is bent to provide a shackle bolt engaging eye 33. The end of the plate is given a lateral bend so that the shackle engaging eye extends at right angles to the side bars of the frame, and the plate is also given a vertical bend to furnish clearance for the spring when in longitudinal motion. In Figs. 6 and 7 is illustrated a slightly modified form of spring. In this instance a reinforcing U-shaped clamp is provided for the spring member 19.

The upper members 18 of the springs extend parallel to the side bars 5 of the frame while the lower members 19 are disposed at an angle to the side bars of the frame, the two members of the springs diverging in two directions. The pivotal connection of the butt ends of the springs to the frame permits the springs to act in series with each other, each member of the spring deflecting part of the total deflection of the spring. Under heavy deflection the two members of the spring will come together for a distance of several inches, shortening the flexible part of each spring member, increasing the strength of the spring and avoiding danger of breakage. It will be observed that this particular construction provides for cushioning and absorbing relatively small or light shocks as well as extremely heavy or severe shocks, without the use of auxiliary under load or coil springs and of over load springs or bumpers. The upper member 18 of the spring has considerable camber while the lower member 19 is only cambered to a relatively slight extent, and one spring member is longer than the other which causes the periods of oscillation of the respective spring members to be different, the springs acting to damp out the vibrations of each other. The weight carrying pivots 12—13, are preferably placed as far above the spring pivot in the vertical plane as practical to insure the frame stability against rolling.

The special diverging arrangement of the spring members adds greatly to their resistance to torsional strain and in this way aids materially in preventing rolling of the body of the vehicle. The relatively broad construction of the lower spring members having only relatively slight camber, said spring members being substantially flat under normal load, also contributes to produce this result. The outer ends of the upper spring members 18 are engaged with bolts 34 of double looped shackles 35 of well known construction.

It will be noted that in the construction described practically the entire weight of the vehicle body is borne by the short shafts or pivots 12 and 13 and that these are located at the extreme ends of the frame so that all of the advantages of a long wheel base are obtained.

The equalizing members or bars 14 and 15 serve to distribute shocks received through one wheel, and the stress of unevenly distributed loads to all of the springs. The action of the equalizing bars 14 and 15 is as follows: When one end of one of the axles is raised, the lower spring member of the spring connected thereto is put under stress, bends a certain amount, and being free to turn rises and passes some of the extra stress on to the upper spring member, which in turn absorbs a part of the shock and passes the balance of the stress to the spring at the opposite side of the frame, the equalizing bar raising at one side and lowering at the other side and increasing the tension in the upper spring member at the other side of the frame which in turn acts on the lower spring member. As is apparent the equalizing members or bars act in a similar way when more weight is placed on one side of the vehicle body than on the other, the equalizing bars serving to distribute the weight throughout the several springs to provide an even support for the vehicle body. As will be understood this construction serves to prevent lateral rolling of the body, at the same time facilitating the use of relatively light springs.

An important novel feature of the invention resides in the special shackle construction provided for connecting the lower members 19 of the springs to the axles that provides for the desired long longitudinal movement of the spring in the longitudinal cushioning movements of the axles with a relatively short shackle, allowing the spring to be hung close to the axle, and providing for cushioning the axle against lateral shocks received through the wheels. This construction, reference being had particularly to Figs. 8, 9 and 10 of the drawings, comprises a bearing member consisting of two sections 36 and 37 provided with openings 38 to fit about the axle and fixedly secured together and to the axle by a transverse fastening member 39. The bearing is provided in its outer face centrally thereof with a relatively broad annular groove 41 and at each end with annular grooves 42 and 43. Mounted on the bearing within the central groove 41 is a band or sleeve consisting of two semi-circular sections 43' and 44', the sections being provided at their upper ends with extensions 45 and 46 connected together by bolts 47, and with extensions 48 and 49 at their lower ends connected by transverse bolts 49'. 50 designates the shackle loop the upper bar 50' of which is interposed between and rigidly secured to the lower extensions 48 and 49, the bolt 49' passing through openings 53 in the extensions and opening 54 in the said bar 50'. The sleeve sections 43'—44' are of a width less than the distance between the side walls of the central groove 41, to provide for a limited movement of the bearing sleeve laterally on the bearing. Interposed between opposite sides of the sleeve and the side walls of the central groove are spring washers 54'. In order to protect the bearing and prevent the entrance of dirt thereto I provide a casing consisting of semi-circular sections 55—56 adapted to fit over opposite sides of the bearing and sleeve, said sections being provided with upper extensions 57—58, and lower extensions 59—60, the ears being provided with openings for the passage of the securing bolts 47 and 49', the casing being secured in place by said bolts. 61' designates filler blocks of wood or other suitable material suitably secured in the spaces within the casing at the ends of the upper extensions 57, 58, and 62 designates washers of felt or similar material placed in the end grooves 42, 43. For the purpose of lubricating the bearing, an oil passage 62' is provided in the abutting faces of the upper ears, and 63 is a grease cup supported on the upper ends of the ears and communicating with said passage. As will be understood the shackle sleeve is adapted to rotate on its bearing and to also have a limited lateral movement thereon. In addition to providing for the necessary long longitudinal movement of the springs in the longitudinal cushioning movement of the axles, the shackle construction also provides, through the spring washers 54' at the sides of the sleeve, for cushioning the axles against lateral shocks received through the wheels.

Located at each end of the frame centrally of the sides thereof are vibration check devices. These are of the same construction as that fully set forth and described in a separate application, filed by me September 13, 1916, Serial No. 119,937. Referring particularly to Figs. 15, 16 and 17 of the drawings, these vibration check devices each comprise a casing or cylinder of metal consisting of a cylindrical wall or portion 70, an integral end wall or head 71 and a removable cover plate or head 72. The casing or cylinder is divided into chambers 73 and 74 by a vertical transverse partition 75. Arranged centrally of the casing for rotation is a shaft 76. The shaft extends through a stuffing box 77 on the cover plate 72, through an opening 78 in the partition 75 and has its inner end supported in a bearing 79 on the end wall 71. Secured to the shaft 76 are diametrically oppositely disposed pistons 80 slidably fitting the walls of the chamber 73 and adapted to oscillate within the chamber. 81 designates diametrically oppositely disposed partitions dividing the chamber 73 longitudinally and constituting radial abutments. Each partition is provided with an opening 82 and with a check valve 83 adapted to permit the passage of liquid through the opening from one side of the partition and to prevent the passage of liquid through the opening from the opposite side of the partition. Any suitable form of check valve may be employed for this purpose. The construction shown consists of a plate 84 having a pivotal connection 85 at one edge with the partition at one side thereof, the plate being adapted to lie flat against one side face of the partition to close the passage, and to be opened and closed by the pressure of the liquid. The partitions 81 are shown as separate plates supported in position by engaging grooves 86 in the walls 70 and 71 of the casing and in the transverse partition 75, the inner ends of the partition plates 81 slidably fitting against the shaft 76. The partition 75 is also formed as a separate plate fitting against the annular shoulder 87 on the cylindrical wall 70 and a shoulder 88 on the shaft 76. The several parts are securely held in place in the casing by the removable cover plate 72. The cover plate has an inwardly extending annular flange or collar 88' provided with a threaded outer face engaging an interiorly threaded portion 89 of the cylindrical wall 70, the inner end of the flange or collar 88' being screwed up against a gasket 90 interposed therebetween and an annular shoulder 88'' on the cylindrical wall 70.

The vertical transverse partition 75 is provided with relatively large openings 92, one of such openings 92 being located adjacent the inlet side of each of the partitions 81, and said partition 75 is also provided with series of smaller openings 93. The openings 92 are shown in the drawing as segmental shaped, and the openings 93 as circular and disposed in radial rows at intervals about the partition between the openings 92 and the abutments 81.

Rigidly secured to the casing or cylinder are a pair of levers 94 and 94', which are disposed opposite to each other at opposite sides of the casing. The end wall 71 of the casing is provided with a projection or boss 95, and the cover plate has a projection or boss 96, and the levers at one end have sockets or openings 95'—96' to fit over the bosses. The boss 95 is cylindrical while the boss 96 has angularly disposed faces, the respective sockets or openings 95', 96' being correspondingly shaped. The levers are clamped to the sides of the drum by a bolt 97 passing through apertures 98 in the levers and through an opening 99 in an integral extension or boss 100 of the cylindrical part 70 of the casing. The portions of the levers extending outwardly from the drum converge and the levers are connected at their outer ends by a hollow rivet 101 engaging apertures in the levers. 103 designates a short lever provided at one end with a socket opening 104 to fit over the angular faced nut 105 that forms a part of the stuffing box 77. The forward end of the lever 103 is provided with an aperture 106 to engage the bolt 97. The levers 103 and 94 constitute adjusting and locking means for the nut 105 and the screw cover plate 72. As will be understood, in assembling the parts, these levers are engaged respectively with the boss 96 and nut 105 and may be used as wrenches to adjust these parts, after which the levers are positioned to bring their bolt apertures in alinement with the bolt opening 99 of the boss 100, and secured by the bolt 97, the short lever lying against the lever 94. 106' designates a cotter pin or the like engaging an aperture in the end of the bolt 97. 107 is a lever rigidly secured at one end to the outer end of shaft 76, the end of the shaft projecting outwardly a slight distance beyond the cover plate 72 and being provided with a shoulder 72'. The lever 107 has a socket or opening 108 at one end thereof to fit over the end of the shaft. The lever 107 is held in place on the end of the shaft against the shoulder 72' by a suitable lock nut 73' engaging a threaded portion 74' of the shaft. At the other end of the cylinder arranged opposite to the lever 107 is a lever 110 having a socket or opening 111 at one end to loosely engage the boss 95. The portions of the levers 107 and 110 that extend outwardly from the drum converge and are connected at their outer ends by a hollow rivet 112, the latter engaging apertures 113 in the ends of the levers. 109', 110' designate washers interposed between the ends of the respective pairs of levers. A washer 109 is interposed between the adjacent ends of levers 110 and 94'. 111' designates a nut engaging a threaded portion 112' on the boss 95 to maintain the socket portions of the levers 94'—110 in position on the boss, and 110' is a washer between the nut 111' and the socket portion of the lever 110. The outer ends of the levers 94—94' of each checking device are pivotally secured to the outer end of one of the short shafts or pivots 12 and 13, and the outer ends of the levers 107 and 110 are pivotally connected to one of the axles. In the drawings, reference being had particularly to Figs. 20, 21, 22 and 23, the levers 94—94' are shown connected to a bracket 113' on the chassis, and the levers 107 and 110, with a bracket 114' on one of the vehicle axles, the hollow rivets 101 and 112 of the pairs of levers loosely engaging bolts 115' and 116', which latter engage openings in the spaced ears 117²—118² of the respective brackets.

The casing or cylinder is filled with liquid, preferably oil, through an opening 114" in the cylindrical part 70, the opening being closed by a screw plug 115".

The operation of the vibration check devices is as follows:

When the axle receives a shock that comprises the vehicle springs, the pair of levers 94, 94' and the pair of levers 107 and 110 approach each other, and the shaft 76 is caused to move in an anti-clockwise direction. As the pistons move forwardly the liquid is forced ahead of them, check valves 83 open under the pressure of the liquid, and permit the liquid to pass through the openings in the radial abutment walls or partitions 81. Any surplus liquid that cannot readily pass through the openings 82 flows through the relatively large openings 92 in the partition plate 75 and back behind the pistons through the smaller openings 93, no resistance being offered to the compression stroke of the spring gear. On the return or rebound stroke of the springs, the shaft 76 rotates clockwise and the casing or cylinder moves in the opposite direction, and the pistons in order to advance must force the oil through the smaller openings 93 in the partition plate. The openings 92 provide a passage through the partition 75 for the liquid in front of the pistons, which gradually decreases in size as the pistons approach the closed sides of the radial abutment walls or partitions 81. At first the resistance to the movement of the pistons is small owing to the number of openings 93. As the pistons progress the number of openings 93 of the partition plate become less ahead of the pistons and consequently the resistance is gradually increased until the pistons are brought to rest.

It will be noted that this construction affords a very wide range of dampening or retardation of gradually increasing intensity. By changing the location, number and size of the openings 93 in the partition plate 75, the time and the amount of retardation can be graduated to any desired degree. The provision of the double piston and abutment arrangement provides a balanced construction in which the strains are distributed and lessens the liability of breakage under exceptionally heavy shocks.

Means is provided by which the resistance or retarding action of the check can be readily adjusted to suit various requirements in the use of springs of different tension and vehicle bodies of different weights. The means for this purpose is a shutter or valve movable over one side face of the partition 75 to close more or less of the openings 93 and vary the size of the passage through the partition. The valve or shutter is shown as consisting of two segmental shaped plates 116 connected to a ring 117 that is mounted for rotation on the shaft 76 in the chamber 74 adjacent the partition 75. The valve or shutter is held in position against the outer face of the partition 75 by a retaining ring or collar. The collar has an annular outer portion 117' and an inner annular offset portion 118'. The outer portion 117' of the collar fits between the partition 75 and the gasket 90, and the offset portion 118' overlaps the outer marginal portions of the segmental shaped plates of the valve. 118 designates an adjusting rod or shaft which extends through a stuffing box in the casing and is mounted for rotation in a bearing 119. On the outer end of the rod is a handle part 120. The rod at its inner end has a threaded portion in engagement with a block 121, which has a pivotal link connection 122 with one of the segmental plates 116 of the shutter.

It will be observed that the glands at the stuffing box 77 and round rod 118, and the joint between the flange or collar 88 of the cover plate 72 with the cylindrical part 70 of the casing, are located outside of the piston and abutment chamber 75 and are never under pressure of the retarding liquid so that liability of leakage through the cover joint and stuffing box is reduced to a minimum. It will also be remarked that the construction is of a very simple, compact and durable nature and that the parts can be conveniently assembled and removed.

Separate means is provided to support the axle for cushioning movement longitudinally of the frame, said means comprising the following construction:

Referring particularly to Figs. 11, 12, 13, 14, 14a, the transmission shaft is composed of two sections 123 and 124 in sliding telescoping engagement, and the shaft housing is also composed of two sections 125 and 126 in sliding telescoping engagement with each other. 126' designates radius rods secured at their outer ends to the rear axle housing, and at their inner ends to section 126 of the transmission shaft housing, the inner ends of the rods being secured at opposite sides of the section between ears 128 extending laterally from the section. The shaft section 123 has an enlarged portion 130 provided with a rectangular bore 131 extending longitudinally thereof from one end. The shaft section 124 has a reduced squared portion 132 at its forward end to work in the bore 131 of the section 123. 133 designates a roller bearing consisting of a rectangular shape retaining frame or cage 134 in which are mounted rollers 135 arranged in sets at the side faces of the frame 134 to project beyond the cage at the inner and outer sides thereof. The roller bearing slidably engages the bore 131 and the reduced shaft portion 132 slides in the roller bearing, provision being thus made for a smooth and easy working of these parts. In order to provide for maintaining of the roller bearing 133 in proper working relation with the relatively movable shaft sections 123—124, I provide a gear connection comprising rack bars 136 and 137 secured respectively to the shaft section 124 and to the shaft section 123, and a pinion 138 mounted on the outer end of a rod 138' secured to the frame 134 and meshing with both of the rack bars 136 and 137. 139 designates the universal joint of the transmission shaft, from one side of which extends a short shaft section 140 provided at one end with a socket 141. The shaft section 123 has a reduced portion 142, the forward end of which fits within the socket 141, and the parts are made fast by a transverse connecting member 143. 144 designates a bearing within the housing section 125 for the reduced portion 142 of the shaft section 123, and 145 is a bearing on the housing section 126 for the section 124 of the transmission shaft. A washer plate 145' of felt or other suitable material is provided to prevent the escape of oil to the opposite side of the bearing 145. On the shaft section 123 near the rear end thereof is a bearing to prevent vibration of that part. The bearing which is shown as one of the anti-friction ball type may be of any approved construction and mounted in place in any suitable manner. 148 designates a main outer metal cylinder, which has openings 149—150 centrally of its end walls or heads 151—152, through which extend the telescoping sections 126—125 of the shaft housing. The cylinder 148 is rigidly secured to the housing section 125, screws or like fastenings 153 connecting the head or end 151 of the cylinder to a fixed collar or flange 154 on the housing section. Within the cylinder at opposite ends thereof are annular pistons 155 and 156, and interposed between the pistons is cushioning means in the form of a coil compression spring 157. The end or head 152 of the cylinder is removable, said head having an interiorly threaded flange 158 engaging a threaded portion 159 of the cylinder. 160 designates a packing between these parts. The removable head 152 adjoining its opening 150 has a tubular extension 161 provided with a stuffing box 162, and slidably fitting within said extension is a tubular piston rod 163 which is connected with the piston 156. The housing section 126 slidably fits within the annular piston 156 and its tubular piston rod 163, the latter being provided with a stuffing box 164 making a fluid tight joint between these parts. The piston 155 slidably engages the housing section 125 and has secured thereto a small cylinder 165 having a removable end or head 166 provided with a central opening 167 to slidably fit over the housing section 126. 168 designates an annular piston in the small cylinder fixed to the housing section 126 and interposed between said piston 168 and the piston 155 is a coil compression spring 169.

The piston 155 is provided with air ports 170 and with a check valve controlling the ports to permit the passage of air therethrough in one direction. Any suitable form of check valve may be employed for this purpose. The particular construction shown, reference being had particularly to Figs. 13 and 14 of the drawings, comprises an annular plate 170' supported on short rods 171 slidably engaging apertures 172 in the piston. The plate 170' is secured to the rods at the outer ends thereof, and the inner ends of the rods are provided with heads 173 to limit the movement of the rods in one direction. The pistons 156 and 168 are provided respectively with air ports 156' and 168', and these pistons are also equipped with check valves that are similar in construction to the check valve of piston 155. 175—176 and 175'—176' designate respectively the valve plates and supporting rods for the pistons 156 and 168. On the housing section 126 is a fixed collar 177 adapted when the housing section is moved forwardly within the cylinder 148 to engage the stuffing box at the outer end of the tubular piston rod 163 and move the piston 156 forwardly against the tension of the coil compression spring 157.

The operation of this construction is as follows:

In Fig. 11 the parts are shown in normal position. If a shock is received through the rear housing section 126 moving said section forwardly within the cylinder 148, the fixed collar 177 on the housing section is brought into engagement with the stuffing box at the outer end of the tubular piston rod 163, carrying the piston rod and piston 156 forwardly with it against the gradually increasing resistance of the coil compression spring 157, at the same time piston 168 on the housing section 125 is moved forwardly against the tension of the spring 169. On this forward movement of the piston 156 and 168 the check valves of the pistons are forced open by the air pressure and air is permitted to flow to the opposite sides of the pistons. When the shock has subsided or been absorbed by the springs 157 and 169, the pistons are forced back by the springs to their normal positions. On the return stroke of the pistons the check valves thereof are closed by the air pressure, the pistons being cushioned in their return movement by the air compressed between one side thereof and the ends of the cylinders. When a shock is received through the housing section 126 moving the same rearwardly, the piston 168 engages the end or head 166 of the cylinder 165 so that the cylinder 165 is carried rearwardly with the housing section 126 against the gradually increasing resistance of the coil compression spring 157. When the shock has been overcome by the spring, the piston 155 is forced back to normal position by the spring. On the forward movement of the piston 155 its check valve is opened by the air pressure to permit the passage of air through the air ports in the piston. Upon the return stroke of the piston 155 the check valve closes the air ports in the piston, provision being thus made for the cushioning of the piston on its return stroke by the air compressed between the closed side of the piston and the end 151 of the cylinder.

It will be noted that this construction provides for imposing a substantially equal resistance to the longitudinal movement of the rear axle in both directions, the auxiliary cushioning means or small coiled spring 169 acting to absorb the drive thrust of the transmission shaft and equalizing and offsetting the effect of the drive thrust of the shaft so that the action of the check is substantially equal in resisting the backward and forward movement of the axle under road shocks.

The cylinder 148 is adapted to be plentifully supplied with lubricating oil through an opening 179 that is closed by a screw plug 180, and means is provided for the circulation and thorough distribution of the lubricant to the various working parts of the device. The bearing 144 is provided with a bore 181 extending through the same from one end thereof to an annular oil groove 182 in the inner face of the bearing. The reduced part 142 of the shaft section 123 has a transverse bore 183 located opposite the annular oil groove 182, and 184 is a longitudinal passage connecting the transverse bore 183 with the bore 131 inside of the shaft section 123. 185 designates a packing ring at one end of the bearing 144 to prevent the escape of the lubricant therefrom. A short conduit pipe 186 has one end fitting in the outer end of the bore 181 and has its outer end connected with the outlet of a valve casing 187. 188 and 189 designate conduits leading respectively from the opposite ends of the cylinder 148 to inlet passages 190 and 191 in the valve casing 187, said passages being controlled by ball check valves 192—193 to permit the flow of lubricant in one direction through the conduits 188 and 189 to the short conduit pipe 186. Upon each return stroke of the pistons 155 and 156, a quantity of oil is forced under pressure from the ends of the cylinder 148 through the conduits 188 and 189, the conduit pipe 186, the passage 181 to the annular oil groove 182, thence flowing through the transverse bore 183 and the passage 184 to the bore 131, a sufficient quantity of the lubricant being supplied to the bore 131 so that the moving parts within the outer cylinder operate in a bath of oil, oil being also supplied to the bearing 144 and 145. 194 designates an opening in the housing section 125, providing a passage from the interior of said section into the smaller cylinder 165, and 195 is an opening in the piston 155 through which the oil is adapted to pass from the small cylinder 165 back into the outer cylinder 148.

At the forward end of the frame and secured to the under side of the engine crank case 10 is a metal cylinder 195'. Within the cylinder at opposite ends thereof are pistons 196 and 197, and interposed between the pistons is spring cushioning means in the form of a coiled compression spring 198, said spring acting to offer a gradually increasing resistance against the forward movement of the pistons and normally acting to maintain the same at the ends of the cylinder. The piston 196 is provided with a central opening 197' and is fixed on a tubular piston rod 200 extending through an opening 201 in one end or head 202 of the cylinder, and a stuffing box 202', said rod projecting a substantial distance outside of the cylinder. 203 designates a tubular rod slidably fitting within the tubular piston rod 200, and 204 is a piston rod secured at one end to the piston 197 and having its forward end slidably fitting within the interior of the inner end portion of the tubular rod 203, said tubular rod 203 being provided at its outer end with a fixed collar 204', which is adapted on the movement of the rod inwardly to engage the outer end of the tubular piston rod and carry the rod and its piston 196 inwardly against the resistance of the coil spring 198. The tubular rod 203 at its inner end is provided with a head 205 which upon movement of the rod 203 outwardly from its normal position, indicated in the drawings, engages a head 207 fixed near the outer end of the piston rod 204 so that the piston 197 will be carried forwardly with the rod 203 against the gradually increasing resistance of the coiled spring 198. 207' is a bearing fast to rod 204 to help keep 203 and 204 in alinement. The pistons 196 and 197 are provided with ports 208 and with check valves 209 controlling the ports to permit the passage of air through the same in one direction, said check valves being of the same construction as that previously described and illustrated in Figs. 13 and 14 of the drawings. The front axle is connected to the tubular rod 203 by radius rods 210, the radius rods at their rear ends being joined together and connected by a universal coupling with the outer end of the tubular rod 203. At the outer end of the tubular rod is a sleeve 211 fixedly secured thereto and having at its under side a spherical socket 212 which is engaged by a spherical head 213 at the rear ends of the radius rods. 214 designates a bracket secured to the under side of the engine crank case to which is secured a short shaft 215 over which slides the forward end of the tubular rod, said shaft forming a support for the tubular rod at its outer end.

Lubricating oil is supplied to the cylinder through an opening 216 therein, said opening being closed by a screw plug 217. 218 designate a flexible bellows casing of leather or other suitable material secured at its opposite ends to the tubular rod and the piston rod 200 to prevent the entrance of dirt between these parts.

It will be remarked that the particular means provided for cushioning movements of the axles longitudinally of the frame, not only affords a very simple and compact construction, but that the particular application of one of the shock absorbing devices to the transmission shaft provides for taking up the driving strains of and shocks received through the driving shaft due to accelerations and retardations of the vehicle.

Referring to Figs. 24, 25, 26, 27, 28, and 29 of the drawings, which illustrate a modified form of frame and equalizer bar construction, 219—220 and 221, designate respectively side, end and truss members of the vehicle frame. 222 designates transverse bolster members secured to the upper face of the chassis in any desired way, and 223 are the equalizer bars pivotally connected intermediate their ends to said bolster members. The bolster members 222 are shown as having convex upper faces 224 and the equalizer bars as of bowed formation. The equalizer bars are preferably of U-shaped construction in cross section and conveniently constructed of steel channels. Each equalizer bar has spaced bearing extensions or ears 225 located centrally of the bars and depending from the under sides thereof, said extensions or ears 225 straddling the bolster member, the equalizer bars being pivotally connected to the bolster member by pivot bolts 226 engaging a bearing 226' of the bolster and passing through openings in the bearing extensions or ears 225. 228 designates shackles connecting the ends of the equalizer bars with the upper leaf members 228' of the springs. The lower leaf members 229 of the springs are connected at their outer ends to the axle 230, and the butt ends of the springs are pivotally connected to the truss member 221 of the chassis, a sleeve or eye 231 that is secured to the butt ends of the springs engaging a bolt 232 supported by the truss members 221. A very strong and durable construction is thus provided that is well adapted to resist twisting strains on the pivotal supports of the chassis, the pivotal supports being located at a relatively high point.

The invention in its broader aspect comprehends the location and connection of the equalizer bars to the chassis at different points along the same. In the construction illustrated in Figs. 1, 2 and 3 of the drawings, the equalizer bars are located at the extreme outer ends of the chassis, which is desirable in many instances.

In the modified construction illustrated in Figs. 24 and 25 the rear bolster member is located at the extreme rear end portion of the frame while the forward bolster member is located a short distance back of the forward end of the frame, the setting back of the bolster member, in this particular instance, providing for the shortening of the upper member of the forward springs so that the usual radiator can be located on the frame in advance of the forward bolster member.

In Figs. 30 and 31 is illustrated another modified form of frame and spring construction. In this instance the front end of the frame 233 is narrowed up to permit short turning of the vehicle. The equalizer bar 234 is of the same type as that shown in Fig. 1 of the drawings but the top spring member 237 is here shown considerably longer than the bottom spring member 237', which gives the two spring members different periods of oscillation, and permits of a greater difference of elevation between the weight carrying pivots 235 and spring pivots 236, it being merely a matter of convenience whether the top or bottom spring member is the longer.

In Figs. 32, 33, 34 and 35 of the drawings, I have illustrated a modified form of equalizer bar and spring construction, the same being particularly adapted for trucks. In this construction the frame or chassis is shown as comprising side bars 238, end bars 239, and truss members 240 and 241.

242—243 designate cross bearers secured to the side bars of the chassis, on which is mounted the supporting pivot 244. 245 designates the equalizer bar shown in this particular instance as substantially straight and of U-shaped construction in cross section. The equalizer bar is provided centrally of its ends with upwardly projecting bearing extensions or ears 246. The equalizer bar 245 has a bearing sleeve 247 that loosely engages the pivot rod 244, the pivot bolt or rod engaging openings in the transverse bearers 242—243 and passing through openings in the bearing extensions or ears of the equalizer bar. 248 designates shackles connecting the upper lead spring members 249 with the outer end of the equalizer bars. 250 indicates the lower spring members connected at their outer ends with the axle 251, the butt ends of the leaf spring members being pivotally connected to the truss member 241 of the chassis, said butt ends of the leaf springs being provided with an eye or sleeve 252 that engages a pivot bolt 253, the latter being secured to the truss members.

It will be remarked that this construction provided for the mounting of the springs inside of the frame at the rear end thereof whereby great breadth of frame is afforded. The equalizer bars are disposed low down so that the same can be conveniently covered by flooring, thus permitting the use of long frames desirable in truck comstructions.

What I claim is:

1. In a vehicle suspension, the combination with a frame and axles of transversely disposed equalizing members pivotally connected intermediate their ends with the frame, and leaf springs at opposite sides of the frame at each end thereof, each spring being connected with one of the axles and with one of the equalizing members at one side of its pivotal connection.

2. In a vehicle suspension, a frame having supporting longitudinally extending pivots at opposite ends thereof projecting beyond the ends of the frame, axles for the frame, transversely disposed equalizing bars at opposite ends of the frame engaging said pivots, and leaf springs at opposite sides of the frame at each end thereof, each leaf spring being connected with the frame, one of the axles and one of the equalizing bars at one side of said pivots.

3. In a vehicle suspension, the combination with a frame and axles therefor, of transversely disposed equalizing members pivotally connected intermediate their ends with the frame, and springs at opposite sides of the frame at each end thereof, each spring comprising a pair of leaf springs having their butt ends connected together and pivotally connected to the frame, and their outer ends connected respectively with one of the axles and one of the equalizing members at one side of its pivotal connection with the frame.

4. In a vehicle suspension, the combination with a frame and axles therefor, of transversely disposed equalizing members pivotally connected intermediate their ends with the frame, and springs at opposite sides of the frame at each end thereof, each spring comprising a pair of leaf springs having their butt ends connected together and pivotally connected to the frame, and their outer ends connected respectively with one of the axles and one of the equalizing members at one side of its pivotal connection with the frame, one leaf spring member extending parallel with the sides of the frame, the other leaf spring member diverging outwardly therefrom.

5. In a vehicle suspension, the combination with a frame and axles therefor, of transversely disposed equalizing members pivotally connected intermediate their ends with the frame, and springs at opposite sides of the frame at each end thereof, each spring comprising a pair of leaf springs having their butt ends connected together and pivotally connected to the frame, and their outer ends connected respectively with one of the axles and one of the equalizing members at one side of its pivotal connection with the frame, the upper leaf spring member extending parallel with the sides of the frame, the lower leaf spring member diverging outwardly therefrom.

6. In a vehicle suspension, the combination with a frame and axles therefor, of transversely disposed equalizing members pivotally connected intermediate their ends with the frame, and springs at opposite sides of the frame at each end thereof, each spring comprising a pair of leaf springs having their butt ends connected together and pivotally connected to the frame, and their outer ends connected respectively with one of the axles and one of the equalizing members at one side of its pivotal connection with the frame, one leaf spring member extending parallel with the sides of the frame, the other leaf spring member having a relatively small degree of camber and diverging outwardly therefrom.

7. In a vehicle suspension, the combination with a frame and axles therefor, of transversely disposed equalizing members pivotally connected intermediate their ends with the frame, and springs at opposite sides of the frame at each end thereof, each spring comprising a pair of leaf springs having their butt ends connected together and pivotally connected to the frame, and their outer ends connected respectively with one of the axles and one of the equalizing members at one side of its pivotal connection with the frame, one leaf spring member extending parallel with the sides of the frame, the other leaf spring member having a relatively small degree of camber and diverging outwardly and downwardly therefrom.

8. In a vehicle suspension, the combination with a frame and axles therefor, of transversely disposed equalizing members pivotally connected intermediate their ends with the frame, and springs at opposite sides of the frame at each end thereof, each spring comprising a pair of leaf springs having their butt ends connected together and pivotally connected to the frame, and their outer ends connected respectively with one of the axles and one of the equalizing members at one side of its pivotal connection with the frame, the upper leaf spring member extending parallel with the sides of the frame, the lower leaf spring member having a relatively small degree of camber and diverging outwardly therefrom.

9. In a vehicle suspension, the combination with a frame and axles therefor, of transversely disposed equalizing members pivotally connected intermediate their ends with the frame, and springs at opposite sides of the frame at each end thereof, each spring comprising a pair of leaf springs having their butt ends connected together and pivotally connected to the frame, and their outer ends connected respectively with one of the axles and one of the equalizing members at one side of its pivotal connection with the frame, the upper leaf spring member being cambered to a relatively large extent and extending parallel with the sides of the frame, the lower leaf spring being cambered to a relatively small degree and diverging outwardly therefrom.

10. In a vehicle suspension, the combination with a frame and axle, of a transversely disposed equalizing member pivotally connected intermediate its ends with the frame, and springs at opposite sides of the frame, each spring comprising a pair of laterally diverging leaf springs having their butt ends secured together and connected to the frame, and their outer ends connected respectively with one of the axles and the equalizing member at one side of its pivotal connection with the frame.

11. In a vehicle suspension, the combination with a frame and axles therefor, of a pair of laterally diverging leaf springs connected together at their butt ends, and connected at their outer ends respectively with one of the axles and the frame.

12. In a vehicle suspension, the combination with a frame and axles therefor, of a pair of laterally diverging leaf springs connected together at their butt ends, and connected at their outer ends respectively with one of the axles and the frame, the lower leaf spring member being cambered to only a small degree.

13. In a vehicle suspension, the combination with a frame and axles therefor, of a pair of laterally diverging leaf springs connected together at their butt ends, and connected at their outer ends respectively with one of the axles and the frame, one of the leaf spring members extending parallel with the sides of the frame and the other leaf spring member diverging outwardly therefrom.

14. In a vehicle suspension, the combination with a frame and axles therefor, of a pair of laterally diverging leaf springs connected together at their butt ends, the outer ends of the leaf spring members being connected respectively to one of the axles and the frame, one of the leaf springs being cambered to a relatively small degree, and reinforcing means for the last mentioned leaf spring member comprising a clamp for its leaf members intermediate the ends of the spring.

15. In a vehicle suspension, the combination with a frame and axles therefor, of a pair of laterally diverging leaf springs connected together at their butt ends, the outer ends of the leaf springs being connected respectively to one of the axles and the frame, one of the leaf springs having only a relatively small degree of camber, and reinforcing means for the last mentioned leaf spring member comprising a clamp for its members intermediate the ends of the spring, and a reinforcing plate secured at one end to the outer end of said spring member and connected at its outer end to the said clamp.

16. A spring for vehicles comprising a pair of leaf springs, means connecting the butt ends of the springs together, said means comprising a top plate, an intermediate plate, a bottom plate, and connecting bolts passing through each of said plates, said intermediate plate extending beyond the butt ends of the spring members and being provided with a shackle engaging eye.

17. A spring for vehicles, comprising a pair of leaf springs, means connecting the butt ends of the springs together, said means comprising a top plate, an intermediate plate, a bottom plate, and connecting bolts, the intermediate plate being bent back upon itself at its inner end to form a check block between the opposing faces of the leaf spring members.

18. In a vehicle suspension, the combination with a frame and axles, of a transversely disposed equalizer member pivotally connected intermediate its ends with the frame, and leaf springs at opposite sides of the frame, each spring being connected with one of the axles and with the equalizing member at one side of its pivotal connection.

19. In a vehicle suspension, the combination with a frame and axles therefor, of a transversely disposed equalizing member pivotally connected intermediate its ends with the frame, and springs at opposite sides of the frame, each spring comprising a pair of leaf springs having their butt ends connected together and pivotally connected to the frame, and their outer ends connected respectively with one of the axles and the equalizing member at one side of its pivotal connection with the frame.

20. In a vehicle suspension, the combination with a frame and axles therefor, of a transversely disposed equalizing member pivotally connected intermediate its ends with the frame at one end thereof, and springs disposed opposite each other at opposite sides of the frame at one end thereof, each of said springs comprising a pair of leaf spring members having their butt ends connected together and pivotally connected to the frame, and their outer ends connected respectively with one of the axles and the equalizing member at one side of its pivotal connection with the frame.

21. In a vehicle suspension, the combination with a frame and axles therefor, of a transversely disposed equalizing member pivotally connected intermediate its ends with the frame and springs at opposite sides of the frame at one end thereof, each spring comprising a pair of leaf springs having their butt ends connected together and pivotally connected to the frame, and their outer ends connected respectively with one of the axles and the equalizing member at one side of its pivotal connection with the frame, one of said leaf spring members being of greater length than the other.

22. In a vehicle suspension, the combination with a frame and axles therefor, of a transversely disposed equalizing member pivotally connected intermediate its ends with the frame, and springs at opposite sides of the frame at one end thereof, each spring comprising a pair of leaf spring members having their butt ends connected together and pivotally connected to the frame, and their outer ends connected respectively with one of the axles and the equalizing member at one side of its pivotal connection with the frame, one of said leaf spring members extending parallel with the sides of the frame and being of greater length than the other leaf spring member, the other leaf spring member diverging outwardly from said first mentioned leaf spring member.

23. In a vehicle suspension, the combination with a frame and axles therefor, of a transversely disposed equalizing bar pivotally connected intermediate its ends with the frame, and springs at opposite sides of the frame disposed opposite each other, each spring comprising a pair of leaf spring members having their butt ends connected together and pivotally connected to the frame, and their outer ends connected respectively with one of the axles and the equalizing bar at one side of its pivotal connection with the frame, the upper leaf spring member extending parallel with the sides of the frame and being of greater length than the other leaf spring member, the lower leaf spring member diverging outwardly therefrom.

24. In a vehicle suspension, the combination with a frame and axles therefor, of a transversely disposed equalizing bar pivotally connected intermediate its ends with the frame, and springs at opposite sides of the frame disposed opposite to each other, each of said springs comprising a pair of leaf spring members having their butt ends connected together and pivotally connected to the frame, and their outer ends connected respectively with one of the axles and the equalizing bar at one side of its pivotal connection with the frame, the upper leaf spring member being cambered to a relatively large extent and extending parallel with the sides of the frame and being of greater length than the lower leaf spring member, said lower leaf spring member being cambered to a relatively small degree and diverging outwardly from the upper leaf spring member.

25. In a vehicle suspension, the combination with a frame and axles therefor, of a transversely disposed equalizing bar pivotally connected with the frame intermediate its ends, and springs located at opposite sides of the frame each spring comprising a pair of leaf spring members having their butt ends connected together and pivotally connected to the frame, and their outer ends connected respectively with one of the axles and the equalizing bar at one side of its pivotal connection with the frame, one of said leaf spring members of each spring extending outwardly at an angle to the sides of the frame, said leaf spring member having a relatively small degree of camber and being substantially flat under normal load.

26. In a vehicle suspension, the combination with a frame and axles therefor, of a transversely disposed equalizing bar pivotally connected intermediate its ends with the frame, and springs at opposite sides of the frame, each spring comprising a pair of leaf spring members having their butt ends connected together and pivotally connected to the frame, and their outer ends connected respectively with one of the axles and the equalizing bar at one side of its pivotal connection with the frame, the upper leaf spring member being cambered to a relatively large extent and extending parallel with the sides of the frame, the lower leaf spring member diverging outwardly from the upper leaf spring member, said lower leaf spring member being broad and cambered to a small degree and being substantially flat under normal load.

In testimony whereof I hereunto affix my signature in the presence of two witnesses.

S. L. CHAUNCEY COLEMAN.

Witnesses:
CHAS. W. WHELPLEY,
W. W. O. FENETY.